United States Patent
Chang et al.

(10) Patent No.: US 9,940,424 B2
(45) Date of Patent: Apr. 10, 2018

(54) SYSTEMS AND METHODS FOR MINIMUM-IMPLANT-AREA AWARE DETAILED PLACEMENT

(71) Applicant: Taiwan Semiconductor Manufacturing Co., Ltd., Hsinchu (TW)

(72) Inventors: Yao-Wen Chang, Taipei (TW); Kai-Han Tseng, Sikou Township (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 8 days.

(21) Appl. No.: 15/164,612

(22) Filed: May 25, 2016

(65) Prior Publication Data

US 2017/0344686 A1 Nov. 30, 2017

(51) Int. Cl.
*G06F 17/50* (2006.01)
*G06F 15/78* (2006.01)

(52) U.S. Cl.
CPC ...... *G06F 17/5072* (2013.01); *G06F 17/5081* (2013.01); *G06F 15/7825* (2013.01)

(58) Field of Classification Search
CPC ............. G06F 17/5072; G06F 17/5081; G06F 15/7825
See application file for complete search history.

(56) References Cited

U.S. PATENT DOCUMENTS

| | | | | |
|---|---|---|---|---|
| 6,446,239 B1 * | 9/2002 | Markosian | .......... | G06F 17/5072 716/122 |
| 6,690,073 B2 * | 2/2004 | Umemoto | ........... | H01L 27/0211 257/202 |
| 7,036,103 B2 * | 4/2006 | Miller | ................. | G06F 17/5072 716/122 |
| 7,137,092 B2 * | 11/2006 | Maeda | ................ | G06F 17/5068 257/E27.107 |
| 7,266,787 B2 * | 9/2007 | Hughes | ............. | H01L 27/11807 2/10 |
| 7,315,994 B2 * | 1/2008 | Aller | .................... | G06F 17/5068 716/106 |
| 7,469,389 B2 * | 12/2008 | Namba | ............... | G06F 17/5072 716/112 |
| 7,774,732 B2 * | 8/2010 | KleinOsowski | .... | G06F 17/5072 716/119 |
| 7,895,548 B2 * | 2/2011 | Lin | ..................... | G06F 17/5068 716/122 |
| 8,028,263 B2 * | 9/2011 | Chong | ................ | G06F 17/5072 716/118 |
| 8,136,072 B2 * | 3/2012 | Frederick | ............ | G06F 17/5072 716/119 |
| 8,495,548 B2 * | 7/2013 | Agarwal | ............. | G06F 17/5072 716/110 |

(Continued)

*Primary Examiner* — Naum B Levin
(74) *Attorney, Agent, or Firm* — Sterne, Kessler, Goldstein & Fox P.L.L.C.

(57) ABSTRACT

The present disclosure is directed to systems and methods for a minimum-implant-area (MIA) aware detailed placement. In embodiments, the present disclosure clusters a violation cell with the cells having a same threshold voltage (Vt) and determines an optimal region for a cluster to minimize the wire-length. In further embodiments, an MIA-aware cell flipping technique minimizes a design area while satisfying the MIA constraint.

20 Claims, 7 Drawing Sheets

(56) References Cited

U.S. PATENT DOCUMENTS

| | | |
|---|---|---|
| 8,601,416 B2 | 12/2013 | Kuo et al. |
| 8,732,626 B2* | 5/2014 | Liu .................... G06F 17/5072 |
| | | 716/50 |
| 8,762,900 B2 | 6/2014 | Shin et al. |
| 8,775,993 B2 | 7/2014 | Huang et al. |
| 8,826,212 B2* | 9/2014 | Yeh .................... G06F 17/5072 |
| | | 716/118 |
| 8,887,116 B2 | 11/2014 | Ho et al. |
| 8,943,445 B2 | 1/2015 | Chen et al. |
| 8,990,762 B2 | 3/2015 | Yuh et al. |
| 9,081,933 B2 | 7/2015 | Liu et al. |
| 9,183,341 B2 | 11/2015 | Chen et al. |
| 9,213,790 B2 | 12/2015 | Hsu et al. |
| 2005/0044522 A1* | 2/2005 | Maeda ................ G06F 17/5068 |
| | | 716/53 |
| 2012/0180014 A1* | 7/2012 | Fang .................. G06F 17/5081 |
| | | 716/112 |
| 2014/0237435 A1 | 8/2014 | Chen et al. |
| 2014/0304670 A1 | 10/2014 | Su et al. |
| 2015/0278419 A1 | 10/2015 | Yang et al. |
| 2015/0370937 A1 | 12/2015 | Liu et al. |
| 2015/0370945 A1 | 12/2015 | Lee |

\* cited by examiner

SYSTEMS AND METHODS FOR MINIMUM-IMPLANT-AREA AWARE DETAILED PLACEMENT

BACKGROUND

Simultaneous timing and power optimization is often a tough task in modern VLSI designs. A popular method to balance these two tasks is to apply multiple threshold voltages (multi-Vt) to reduce leakage power while maintaining circuit performance. In a multi-Vt design, low threshold voltage (LVT) cells are used on critical paths to improve timing, while high threshold voltage (HVT) cells are used on non-critical paths to suppress leakage power. By properly using different Vt cells, a design can achieve high performance while meeting low power requirements. A multi-Vt design can be manufactured by controlling the dopant concentration for different Vt cells by the ion implantation method.

As minimum feature sizes decrease, design rules have become more restricted, and a minimum implant area (MIA) constraint has emerged as a new challenge for the physical design flow. The MIA constraint specifies a lower bound for the areas of implant layers (implant areas for short), and an LVT/HVT cell may incur an MIA violation if any of the two implant areas is smaller than the MIA constraints.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Figures 1A, 1B:
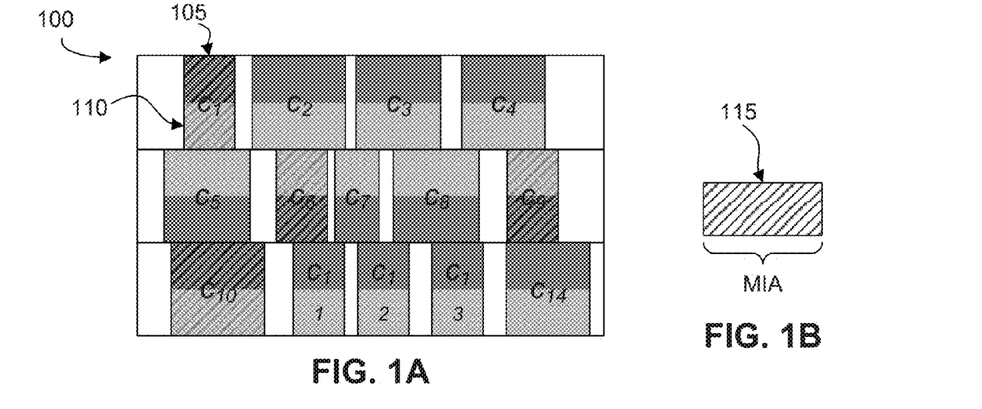
FIG. 1a illustrates a multi-Vt design with multiple implant layers, in accordance with some embodiments.
FIG. 1b illustrates an MIA constraint for the multiple implant areas, in accordance with some embodiments.

FIG. 1a illustrates a multi-Vt design that requires multiple implant masks to achieve the multiple threshold voltages. A multi-Vt design 100 includes a plurality of cells $c_1$ through $c_{14}$. Cells $c_1$ through $c_{14}$ comprise a PMOS implant area 105 and an NMOS implant area 110 for standard threshold voltage cells (SVT), low threshold voltage cells (LVT), and high threshold voltage cells (HVT). FIG. 1b illustrates an MIA constraint 115 for the multiple implant areas of the SVTs, LVTs, and HVTs, i.e., PMOS implant area 105 and NMOS implant area 110, as illustrated in FIG. 1a. In embodiments, MIA constraint 115 can be a minimum width for PMOS implant area 105 and NMOS implant area 110. A person of ordinary skill in the art would know that MIA constraint 115 is not drawn to scale, and the width of MIA constraint 115 illustrated in FIG. 1b is for illustrative purposes only.

According to aspects of the present disclosure, MIA constraint 115 can be, for example, 16 nm. Although MIA constraint 115 can be 16 nm, a person of ordinary skill in the art would understand that the present disclosure is not limited to such an MIA constraint, and that other MIA constraints are contemplated by the present disclosure, e.g., 10 nm and below. The MIA constraint typically varies based on a specific process being implemented in addition to various variables that effect the MIA constraint. For example, the variables can include the implanted species, the dose and energy being applied, the type of resist being used, and the lithographic tools being used.

Still referring to FIG. 1a, multi-Vt design 100 includes a plurality of cells violating MIA constraint 115. For example, cells $c_1$, $c_6$, $c_9$, and $c_{10}$ each violate MIA constraint 115. Although FIG. 1a illustrates four cells in violation of the MIA constraint, a POSA would understand that any number of cells may be in violation of MIA constraint 115. MIA constraint 115 is a minimum cell width constraint for LVT/HVT cells, and MIA violations may occur when cells having widths that are smaller than the MIA constraint 115. Violation cells, e.g., cells $c_1$, $c_6$, $c_9$, and $c_{10}$, may have one implant area, e.g., PMOS implant area 105, satisfy MIA constraint 115, while the other implant area, e.g., NMOS implant area 110, is in violation of MIA constraint 115. NMOS implant area 110 and PMOS implant area 105 may both be in violation of MIA constraint 115. A cell is legal only when both the two implant areas are larger than MIA constraint 115. MIA constraint 115 is a minimum cell width constraint, and this constraint can be used to identify whether LVT/HVT cells have an MIA violation or not. Thus, an MIA violation occurs when at least one implant area is smaller than MIA constraint 115.

Figure 1C:
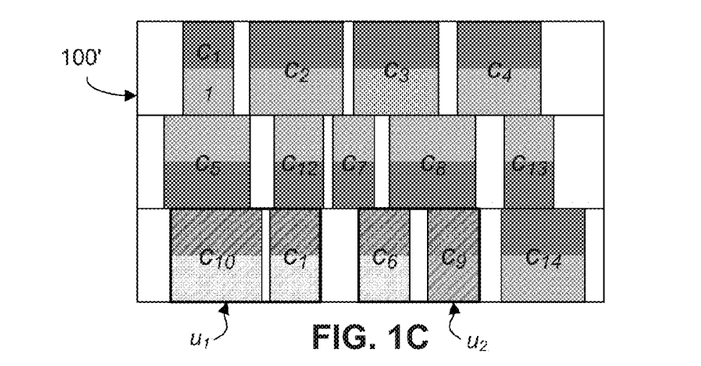
FIG. 1c illustrates the multi-VT design with clustered violation cells, in accordance with some embodiments.

FIG. 1c illustrates multi-Vt design 100' with clustered violation cells. For example, as illustrated in FIG. 1c, violation cells $c_1$ and $c_{10}$ are clustered with one another to form cluster $u_1$ and violation cells $c_6$ and $c_9$ are clustered with one another to form cluster $u_2$. Thus, clusters $u_1$ and $u_2$ are a combination of multiple violation cells, such that clusters $u_1$ and $u_2$ are large enough to satisfy MIA constraint 115.

Figure 1D:
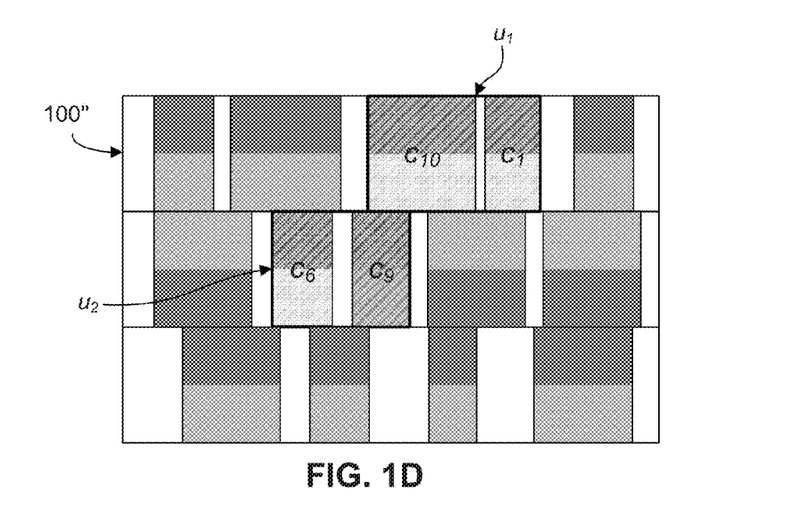
FIG. 1d illustrates the multi-Vt design placed in an MIA-violation-free placement layout, in accordance with some embodiments.

FIG. 1d illustrates the multi-Vt design placed in an MIA-violation-free placement layout. For example, as shown in FIG. 1d, multi-Vt design 100 of FIG. 1a is rearranged to provide multi-Vt design 100". Namely, cluster $u_1$ can be placed in a top row of the multi-Vt design 100" and cluster $u_2$ can be placed in a second row of multi-Vt design 100". To achieve this, cluster $u_1$ can be swapped with one or more cells in the top row and cluster $u_2$ can be swapped with one or more cells in the second row. As a result, the multi-Vt design 100" is MIA-violation-free.

Figure 2:
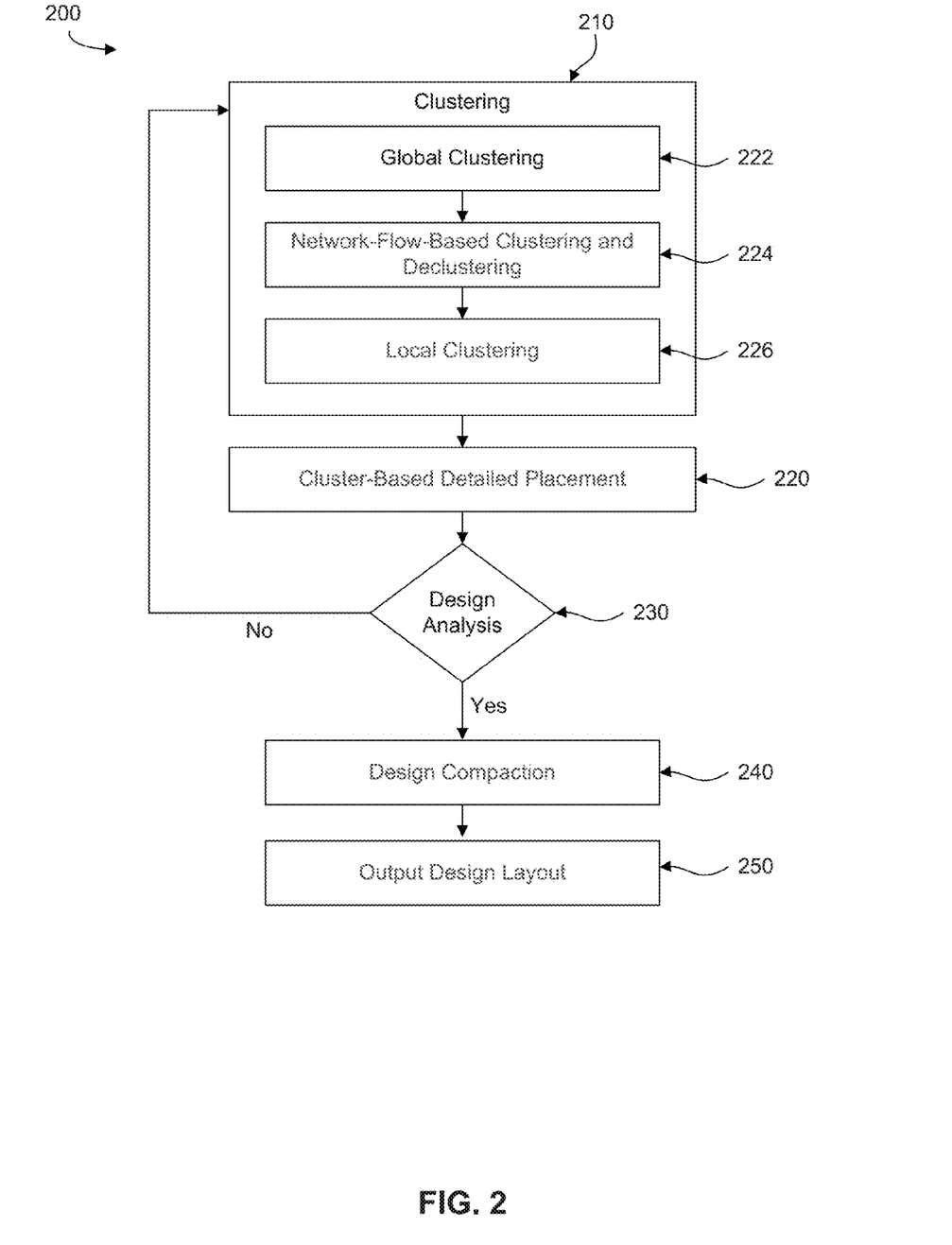
FIG. 2 is a flow chart of an example process for a minimum-implant-area aware detailed placement flow, in accordance with some embodiments.

FIG. 2 illustrates an example process for a minimum-implant-area aware detailed placement flow. A process 200 can be divided in the following operations: clustering 210, cluster-based detailed placement 220, design analysis 230, design compaction 240, and output design layout 250. In embodiments, violation cells, i.e., cells in violation of MIA constraint 115, are clustered with other cells having the same Vt type in clustering operation 210. Clustering operation 210 can be performed in three separate sub-operations including a global clustering operation 222, a network-flow-based clustering and declustering operation 224, and a local clustering operation 226.

Global clustering operation 222 clusters violation cells with the same Vt cells in their optimal regions. The optimal region is based on a median value to find a minimal wire-length for placing a cell $c_i$. In various embodiments, $E_i = \{e_{i,1}, e_{i,2}, \ldots, e_{i,m_i}\}$ denotes a set of $m_i$ nets connecting to cell $c_i$. For each net $e_{i,j} \in E_i$, a contracted bounding box of $e_{i,j}$ can be a bounding box which excludes a pin on the cell $c_i$, where $x_{e_{i,j},l}$, $x_{e_{i,j},u}$ and $y_{e_{i,j},u}$ are the left, right, lower, and upper boundaries of the contracted bounding box of $e_{i,j}$, respectively. In various embodiments, $\tilde{X}_i = (\tilde{x}_{i,1}, \tilde{x}_{i,2} \ldots, \tilde{x}_{i,2m_i})$ is a sorted sequence of $\{x_{e_{i,2}d}, x_{e_{i,2}u}, x_{e_{i,2}l}, x_{e_{i,2}u}, \ldots, x_{e_{i,m_j}d}, x_{e_{i,m_l}u}\}$, and $\tilde{Y}_i = (\tilde{y}_{i,1}, \tilde{y}_{i,2}, \ldots, \tilde{y}_{i,2m_i})$ is a sorted sequence of $\{y_{e_{i,2}u}, y_{e_{i,2}u}, y_{e_{i,2}u}, y_{e_{i,2}u}, y_{e_{i,2}u} \ldots, y_{e_{i,mp}u}, y_{e_{i,mp}u}\}$. According to aspects of the present disclosure, optimal x and y coordinates of $c_i$ can be obtained by solving the optimization problem as follows in Equation (1):

$$\min \sum_{j=1}^{2m_i} |x_i - \tilde{x}_{i,j}| + \sum_{j=1}^{2m_i} |y_i - \tilde{y}_{i,j}|. \quad (1)$$

An optimal solution for Equation (1) involves finding the medians of $\tilde{X}_i$ and $\tilde{Y}_i$. According to aspects of the present disclosure, both $\tilde{X}_i$ and $\tilde{Y}_i$ contain even numbers, and thus the two medians of $\tilde{X}_i$ and $\tilde{Y}_i$ can be the optimal solutions, which form the left, right, lower, and upper boundaries for the optimal region of cell $c_i$.

Global clustering operation 222 simultaneously solves MIA violations while minimizing the wire-length. For example, a cell may still violate the MIA constraint after clustering with other cells in a cluster, and as such, global clustering operation 222 can be designed to find an optimal region of a cluster. For a cluster $u_l = \{c_1, c_2, \ldots, c_{n_{u_l}}\}$ with $n_{u_l}$ cells, the optimization problem of finding the cluster-based optimal region may be listed as follows in Equation (2):

$$\min \sum_{i=1}^{n_{u_l}} \sum_{j=1}^{2m_i} |x_i - \tilde{x}_{i,j}| + \sum_{i=1}^{n_{u_l}} \sum_{j=1}^{2m_i} |y_i - \tilde{y}_{i,j}|. \quad (2)$$

Equation (2) contains multiple variables for both x and y coordinates for the cells inside a cluster. The cells in a cluster are placed consecutively, and as such, a location of any cell can be determined based on any other cell in the cluster. For example, with cell $c_1$ as a base cell in the cluster, cell locations $x_i$ and $y_i$ can be derived as follows in Equations (3) and (4):

$$x_i = x_1 + \sum_{k=1}^{i-1} (w_k + \psi_{c_k, c_{k+1}}), \quad (3)$$

$$i = 1, \ldots, n_{u_l},$$

$$y_i = y_1. \quad (4)$$

In Equation (3), an x-coordinate of each cell is related to cell $c_i$. Because cell widths $w_k$ and the minimum spacings between cells $\psi_{c_k c_{k+1}}$ are constants, all remaining x-coordinates of cells can be defined by a single variable $x_1$, e.g., the x coordinate of cell $c_1$. In Equation (4), the cells in a cluster can be placed in the same row, and as such, the y-coordinates of all the cells are the same as the y-coordinate $y_1$ of the cell $c_1$. By substituting Equation (3) and Equation (4) into Equation (2), a new optimization problem can be defined as follows in Equation (5):

$$\min \sum_{i=1}^{n_{u_l}} \sum_{j=1}^{2m_i} \left| x_1 - \left( \tilde{x}_{i,j} - \sum_{k=1}^{i-1} (w_k + \psi_{c_k, c_{k+1}}) \right) \right| + \sum_{i=1}^{n_{u_l}} \sum_{j=1}^{2m_i} |y_i - \tilde{y}_{i,j}|. \quad (5)$$

In various embodiments, and $\tilde{X}_l = \langle \hat{x}_{l,1}, \hat{x}_{l,2}, \ldots, \hat{x}_{l,2_u m} \rangle$ and $\hat{Y}_l = \langle \hat{y}_{l,1}, \hat{y}_{l,2}, \ldots, \hat{y}_{l,2_u m_l} \rangle$ denote sorted sequences of the constant parts $\tilde{x}_{i,j} - \sum_{k=1}^{i-1}(w_k + \psi_{c_k c_{k+1}})$ and $\tilde{y}_{i,j}$, respectively. The optimal solution for Equation (5) involves finding the medians of $\hat{X}_l$ and $\hat{Y}_l$. Therefore, the optimal region for the cluster $u_l$ can be obtained, and consequently, global clustering for a cluster can be achieved.

In various embodiments, network-flow-based clustering and declustering operation 224 perturbs clusters while maintaining a quality solution. For example, at network-flow-based clustering and declustering operation 224, violation cells can be clustered with other cells, and the cells can be moved between different clusters. By solving a minimum cost maximum flow, new clusters can be obtained while minimizing the wire-length.

At local clustering operation 226, if one or more cells (or clusters) still violate the MIA constraint, violation cells/clusters are locally clustered with nearby cells/clusters to solve the MIA violations. For example, when an MIA violation occurs, the violation cell(s)/clusters can be further clustered with a nearby cell/cluster, such that cells/clusters no longer violate the MIA. In this way, local clustering operation 226 is implemented to resolve any outstanding MIA violations and to generate a cluster-based MIA-violation-free placement.

After clustering operation 210, cell-based detailed placement mechanisms are performed to place the clustered cells at cluster-based detailed placement operation 220. A cluster-based placement with no MIA violation can be generated at cluster-based detailed placement operation 220. In various embodiments of the present disclosure, detailed placement techniques are designed to solve the cluster-based detailed placement. For example, global moving and local moving techniques are applied to the clusters. The global moving technique includes moving a cluster to its optimal region. Local moving may include moving a cluster to a whitespace.

The cluster-based detailed placement operation 220 can further include cluster matching and cluster swapping techniques to minimize the wire-length. In various embodiments, cluster matching includes matching a cluster to another cluster after the global and local moving. Cluster swapping may include swapping clusters with neighboring clusters. Local moving, cluster matching, and cluster swapping can be achieved by treating a cluster as the smallest unit during detailed placement.

By utilizing a cluster-based optimal region, the detailed placement techniques can be extended to a cluster. For example, violation cells with the same Vt cells are clustered together to form larger implant areas without MIA violation, and during placement, these clusters are moved together. After cluster-based detailed placement operation 220, process 200 includes determining whether a quality solution is achieved at design analysis operation 230. When a quality solution has not been obtained, clustering operation 210 and cluster-based detailed placement operation 220 are performed iteratively until the quality solution is obtained.

When the quality solution is obtained, an MIA-aware cell flipping mechanism is utilized in the design compaction operation to compress the layout in design compactions operation 240. For example, during clustering operation 210 and cluster-based detailed placement operation 220, the MIA violations of a placement can be solved and the wire-length is minimized. However, the placement may exceed the initial chip boundary while solving MIA violations. As would be understood by a POSA, different minimum spacings are needed for different cell boundaries. Thus, in embodiments, the layout is compressed into the initial chip boundary using a cell flipping technique to reduce the minimum spacing between adjacent cells. The cell flipping technique utilizes cell orientations to minimize the design area. In embodiments, smaller design areas can be achieved by flipping an orientation of a cell, i.e., flipping a cell along its y-axis. In various embodiments, cell flipping technique is applied in a single row with fixed cell order, and as such, an optimal substructure can be observed and thus can be determined using the cell flipping technique.

Figure 3A:
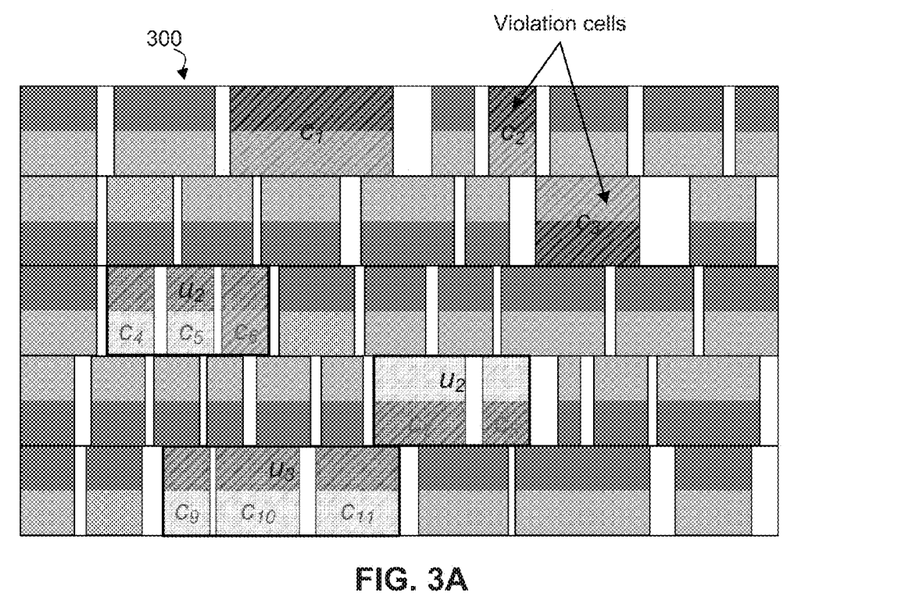
FIGS. 3a-3f illustrate an implementation of the network-flow-based clustering and declustering, in accordance with some embodiments.

FIGS. 3a-3f illustrate an implementation of the network-flow-based clustering and declustering operation 224. For example, as illustrated in FIG. 3a, an initial placement 300 includes a plurality of cells $c_1$ through $c_{11}$. In some embodiments, the plurality of cells $c_1$ through $c_{11}$ are HVT cells; however, those skilled in the art would understand that these cells can also be LVTs or SVTs. As shown in FIG. 3a, cell $c_1$ is a violation-free cell, cells $c_2$ and $c_3$ are violation cells, and cells $c_4$, $c_5$, $c_6$ are formed as a violation-free cluster $u_1$, cells $c_7$ and $c_8$ are formed as a violation-free cluster $u_2$, and cells $c_9$, $c_{10}$, $c_{11}$ are formed as a violation-free cluster $u_3$.

Figure 3B:
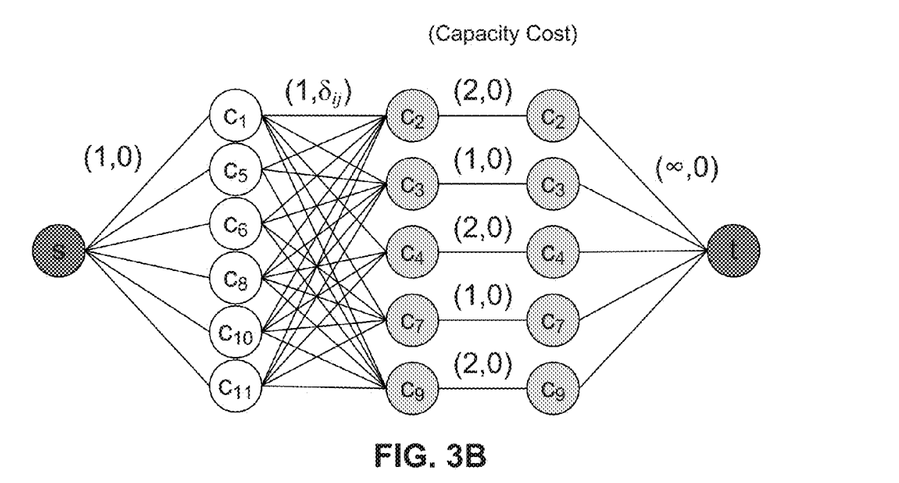

FIG. 3b illustrates a network flow of the plurality of cells $c_1$ through $c_{11}$. For example, in embodiments, cells $c_1$, $c_5$, $c_6$, $c_8$, $c_{10}$, and $c_{11}$ are supply cells and cells $c_2$, $c_3$, $c_4$, $c_7$, and $c_9$ are demand cells. A demand cell is a cell that needs to be clustered with other cells to satisfy the MIA constraint, and remaining cells are supply cells, e.g., candidates to be clustered with the demand cells. For instance, in the example shown in FIG. 3b, violation cells $c_2$ and $c_3$ are the demand cells. In various embodiments, a cell in each cluster can be selected as a demand cell. In the example of FIG. 3b, cell $c_4$ from cluster $u_1$, cell $c_7$ from cluster $u_2$, and cell $c_9$ from cluster $u_3$ are selected as demand cells. Each edge between a supply cell and a demand cell represents that these two cells should be clustered together where the cost is the change of the half-perimeter wire-length (ΔHPWL) for clustering the cells. An upper bound for the demand cells can be specified to prevent having an oversize cluster. Therefore, the capacity $\rho_i$ of the demand cell $c_i$ can be defined as follows using Equation (6):

$$\rho_i = \begin{cases} \left\lceil \frac{w - w_i}{\min_{c_j \in C\{w_j\}}} \right\rceil, & \text{if } c_i \text{ is a violation cell,} \\ |u_k| - 1, & \text{if } c_i \in u_k \end{cases} \quad (6)$$

Thus, if cell $c_i$ is a violation cell, to solve the MIA violation, a maximum number of cells to cluster with $c_i$ can be determined using $$\left\lceil \frac{w - w_i}{\min_{c_j \in C\{w_j\}}} \right\rceil.$$

If $c_i$ originally belongs to a cluster $u_k$, the capacity of cell $c_i$ would be $|u_k-1|$ because the original cluster is still in the solution space.

Figure 3C:
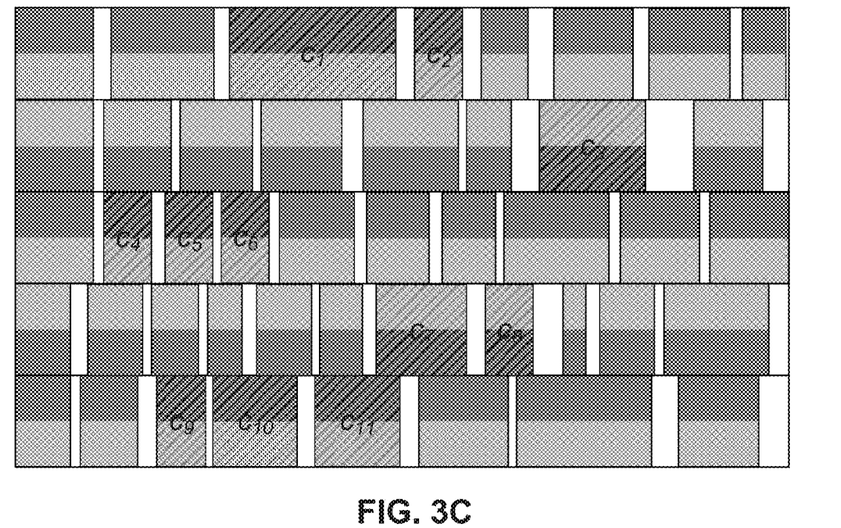
Figure 3D:
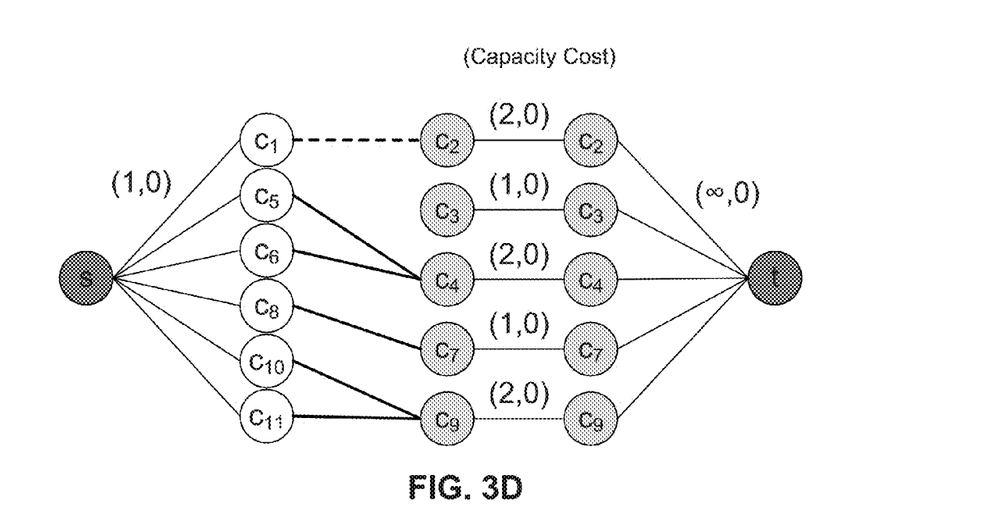

In various embodiments, after solving the minimum cost maximum flow, the supply cell and the demand cell in each flow path represent a pair that can be clustered together. This provides a new clustering solution while minimizing the wire-length. Network-flow-based clustering and declustering operation 224 can be used to maintain the clustering solution for good clusters and perturb bad clusters to find smaller wire-length. For example, FIG. 3c shows an example of clusters after the violation cells have been rearranged. In this example, cell $c_2$ is moved to cluster with cell $c_1$, and the remaining initial clusters are maintained. However, violation cell $c_3$ has not been clustered with another cell or cluster. FIG. 3d illustrates a network flow for the clustering shown in FIG. 3c. As illustrated in the network flow of FIG. 3d, cells $c_1$ and $c_2$ have been clustered, cells $c_4$-$c_6$ have been clustered, cells $c_7$ and $c_8$ have been clustered, and cells $c_9$-$c_{11}$ have been clustered. However, cell $c_3$ has not been clustered with another cell or cluster, and is still violating the MIA constraint.

Figure 3E:
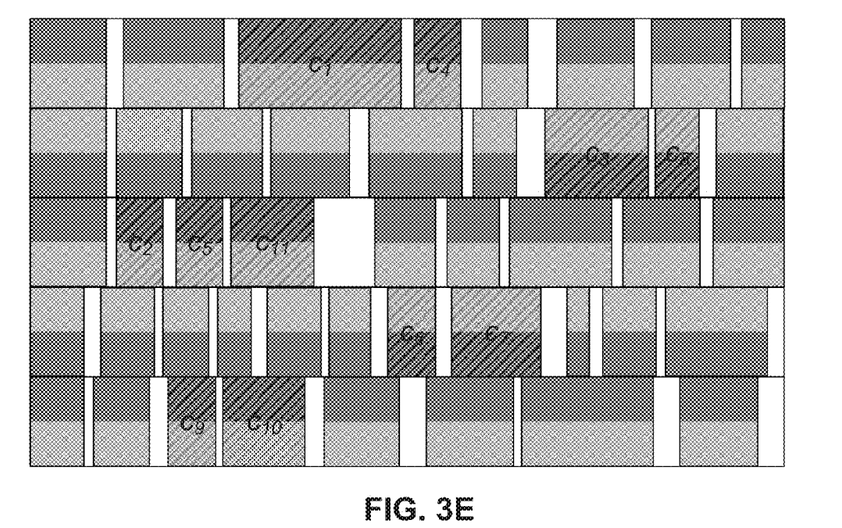
Figure 3F:
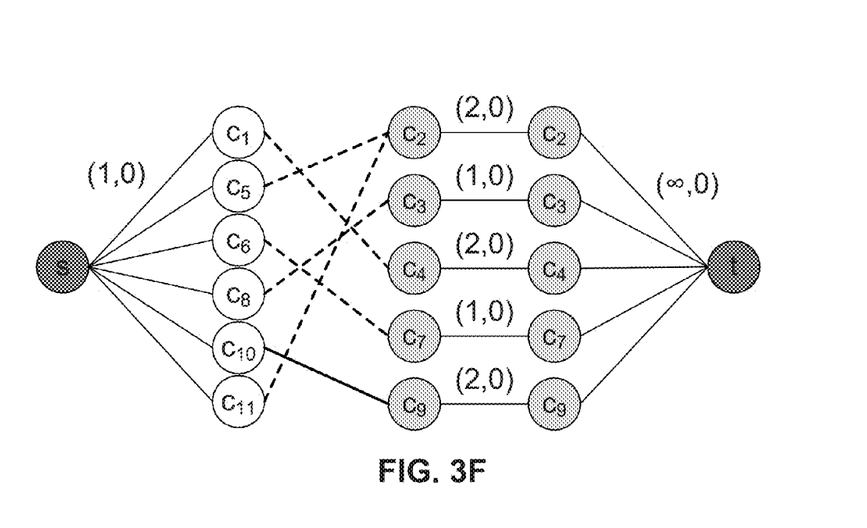

To resolve this, network-flow-based clustering and declustering operation 224 can be repeated when the initial clusters still include MIA constraint violations. Namely, as illustrated in FIGS. 3e-f, cells $c_1$ and $c_4$ are clustered, cells $c_3$ and $c_8$ are clustered, cells $c_2$, $c_5$, and $c_{11}$ are clustered, cells $c_6$ and $c_7$ are clustered, and cells $c_9$ and $c_{10}$ are clustered. As a result, each of the demand cells is clustered with a supply cell, such that all of the clusters satisfy the MIA constraint.

Figure 4A:
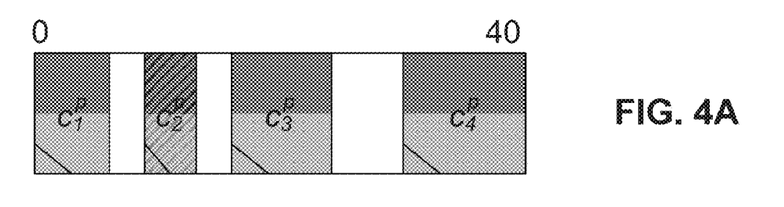
FIGS. 4a-4d illustrate an example process for performing design compaction, in accordance with some embodiments.
Figure 4B:
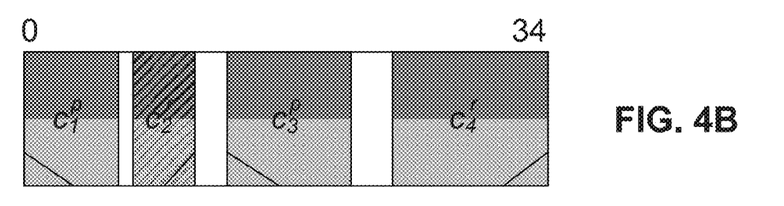
Figure 4C:
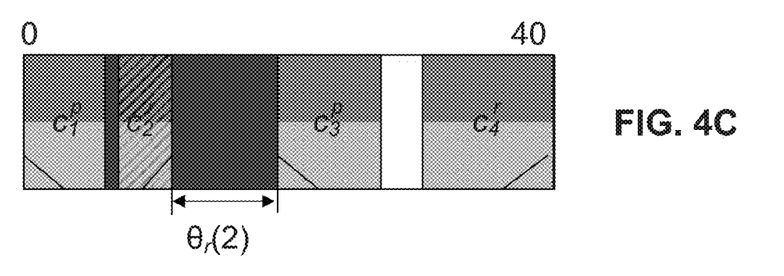
Figure 4D:
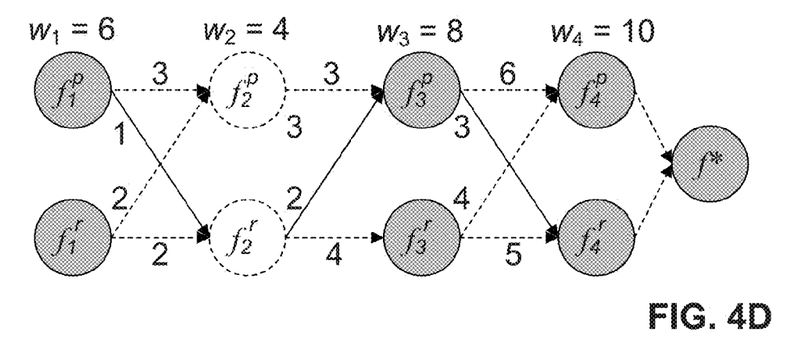

FIGS. 4a-4d illustrate an example process for performing design compaction operation 240. In various embodiments, the design compaction can be performed using a cell flipping technique. FIG. 4a illustrates an initial placement with cells $c_i$ through $c_4$ and the corresponding cell flipping graph is shown in FIG. 4d, where the nodes $f_i^p$ and $f_i^r$ respectively represent two orientations of the cell $c_i$ and edges denote a minimum spacing for different cell boundaries. In embodiments, $s_j = \{c_1, c_2, \ldots, c_{n_{sj}}\}$ denotes the cells in a single row j. An optimal substructure of the cell flipping technique can be derived as follows in Equation (7):

$$T(f_i^\alpha) = \begin{cases} x_i, & \text{if } i = 1, \\ w_{i-1} + \min_{\beta \in \{p,r\}} \left\{ T(f_{i-1}^\beta) + \psi_{c_{i-1}^\beta, c_i^\alpha} \right\}, & \text{if } i > 1 \end{cases} \quad (7)$$

where $\alpha \in \{p, r\}$, f* denotes the optimal cell flipping, and T denotes the cost function of the nodes $f_i^p$ and $f_i^r$ and f*. A flipping result is shown in FIG. 4b where cell $c_2$ and cell $c_4$ are flipped, and a smaller area is obtained as the minimum spacings between respective cells has changed.

For example, as illustrated in FIG. 4d, a width of cell $c_1$ is 6 nm, a width of cell $c_2$ is 4 nm, a width of cell $c_3$ is 8 nm, and a width of cell $c_4$ is 10 nm. In the initial placement, a minimum spacing between cell $c_1$ and cell $c_2$ is 3 nm, a minimum spacing between cell $c_2$ and cell $c_3$ is 3 nm, and a minimum spacing between cell $c_3$ and cell $c_4$ is 6 nm. Thus, a total wire-length of the initial placement is 40 nm. However, after flipping the orientation of cells $c_2$ and $c_4$, the minimum spacing between cell $c_1$ and cell $c_2$ is reduced from 3 nm to 1 nm, the minimum spacing between cell $c_2$ and cell $c_3$ is reduced from 3 nm to 2 nm, and the minimum spacing between cell $c_3$ and cell $c_4$ is reduced to 3 nm. Thus, the total wire-length is reduced from 40 nm to 34 nm.

However, as shown in FIG. 4b, cell $c_2$ violates the MIA constraint. To compress the layout while considering the MIA constraint, the MIA constraint can be relaxed to the cost function of the cell flipping. An optimal substructure can be determined as follows in Equation (9):

$$T(f_i^\alpha) = \begin{cases} x_i, & \text{if } i = 1, \\ w_{i-1} + \min_{\beta \in \{p,r\}} \left\{ T(f_{i-1}^\beta) + \max\{\psi_{c_{i-1}^\beta, c_i^\alpha}, \theta_\beta(i-1)\} \right\}, & \text{if } i \ne 1 \end{cases} \quad (9)$$

where $\alpha \in \{p, r\}$ and $\theta_\beta(i)$ represents the whitespace that needs to be preserved for cell $c_i$, which will be used for filler insertion in the final design stage. The whitespace can be determined using Equation (10):

$$\theta_\beta(i) = \begin{cases} 0, & \text{if } v_{c_i} = v_s \vee v_{c_i} = v_{c_{i+1}}, \\ \max\{\omega - (T(f_i^\beta) + w_i - T(f_{\eta(i)}^\beta) + \lambda_{\eta(i)}^\beta), 0\}, & \text{otherwise} \end{cases} \quad (10)$$

where $\beta \in \{p, r\}$, $v_s$ denotes the SVT, $\eta(i)$ is a mapping function that would obtain the leftmost consecutive cell having the same Vt of $c_i$, and $\lambda_{\eta(i)}^\beta$ represents the remaining whitespace for cell $\eta(i)$. In some embodiments, a rightmost cell in the row may also be a violation cell, and as such, a whitespace should also be preserved when the rightmost cell violates the MIA constraint. Therefore, an optimal cell flipping T (f) is based on Equation (11):

$$T(f^*) = w_{n_{s_j}} + \min\left\{ T(f_{n_{s_j}}^p) + \theta_p(n_{s_j}), T(f_{n_{s_j}}^r) + \theta_r(n_{s_j}) \right\}. \quad (11)$$

By using Equations (9)-(11), the design area can be minimized while considering the MIA constraint. For example, as shown in FIG. 4c, a whitespace is preserved between cell $c_2$ and cell $c_3$. However, simply applying Equations (9)-(11) to compress the cells in a row, may result in a displacement that is too large. To account for this, the optimal substructure can be modified as follows in Equation (12):

$$T(f_i^\alpha) = \begin{cases} x_i, & \text{if } i = 1, \\ w_{i-1} + \min_{\beta \in \{p,r\}} \left\{ T(f_{i-1}^\beta) + \max\{\psi_{c_{i-1}^\beta, c_i^\alpha}, \theta_\beta(i), d_\beta(i-1, i)\} \right\}, & \text{if } i > 1 \end{cases} \quad (12)$$

where $\alpha \in \{p, r\}$, $d_\beta(i-1, i)$ is the whitespace between cells $c_{i-1}$ and $c_i$, which can be formulated as the following equation in Equation (13):

$$d_\beta(i-1, i) = (x_i - (T(f_{i-1}^\beta) + \omega_{i-1})) - \zeta \quad (13)$$

where $\zeta$ is the cell displacement in a single row.

In embodiments, Equation (11) is used to obtain the optimal cell flipping T (f*) for Equation (12), and during design compaction, Equation (12) is used to compress the layout. If the design placement is out of the initial chip boundary, the design placement is again solved using Equation (9). In embodiments, design compaction operation provides an MIA-violation-free placement with minimized wire-length and design area.

Output design layout 250 includes outputting the layout to a machine readable storage medium, wherein the outputted layout is used to manufacture a set of masks used in the photolithography operations of integrated circuit fabrication. During fabrication, manufacturing the set of masks includes transferring to the masks patterns based on the outputted layout. Outputting design layout 250 includes generating a chip layout to provide an opening in a patterned imaging layer. In various embodiments, the opening is configured to meet the MIA constraint. In this way, the generated chip layout can be used to improve fabrication yield results. Additionally, output design layout 250 includes a netlist of the design, coordinates of each cell, coordinates of each macro, an orientation of each cell, an orientation of each macro, an implant layer of each cell, and a standard cell library. In various embodiments, these information can be described in the LEF/DEF formats (Library Exchange Format and Design Exchange Format), which is a representation of the design at any point during the layout process. LEF/DEF files convey logical design data to, and physical design data from, place-and-route tools. Logical design data can include internal connectivity (represented by a netlist), grouping information, and physical constraints. Physical data includes placement locations and orientations, routing geometry data, and logical design changes for backannotation. A POSA would understand that the output design layout is not limited to LEF/DEF formats and that any format that can describe the physical information and the placement result are contemplated by the present disclosure.

Figure 5:
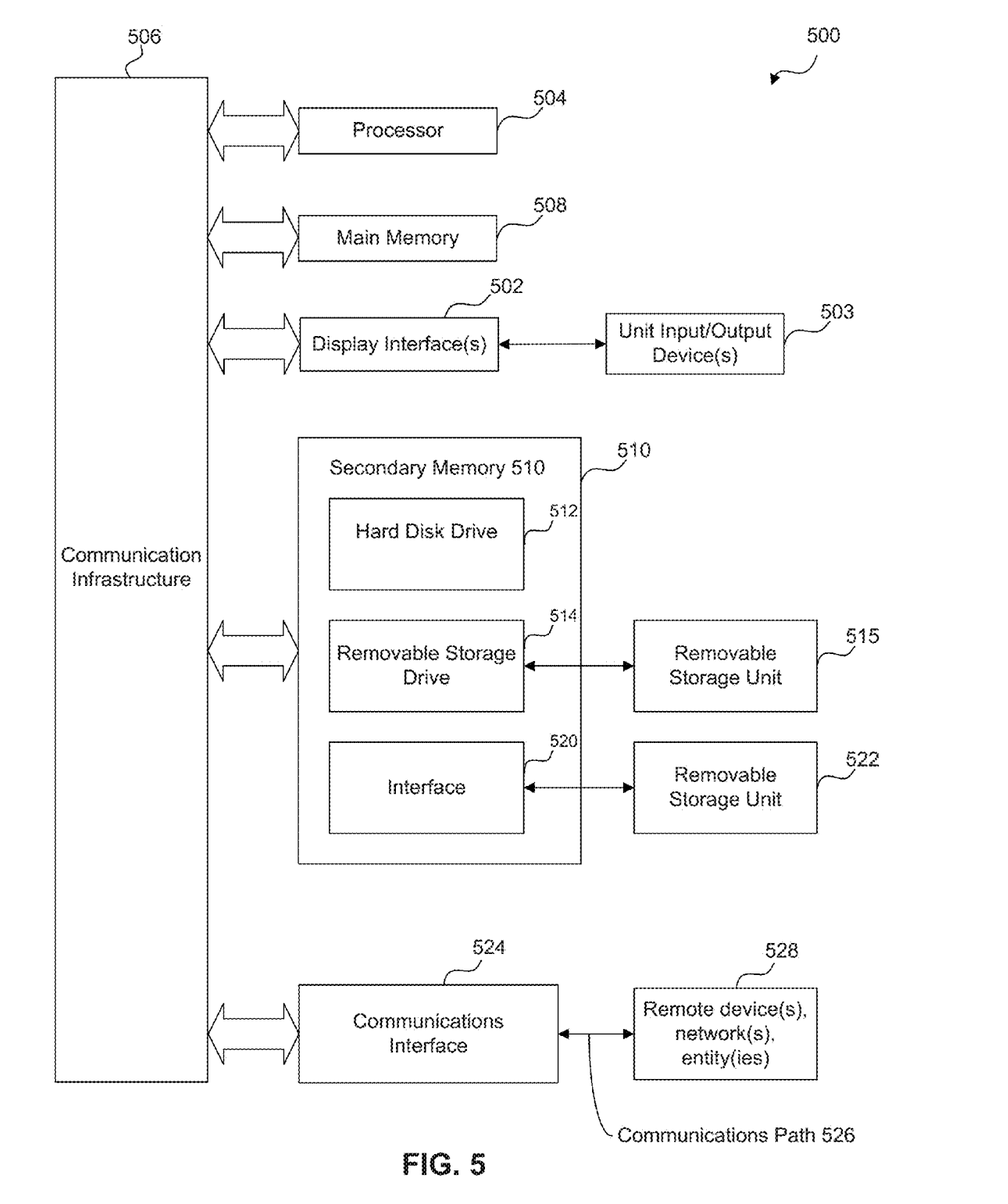
FIG. 5 is a high-level block diagram of an example computer system, in accordance with some embodiments.

Various aspects of the present invention may be implemented in software, firmware, hardware, or a combination thereof. FIG. 5 is an illustration of an example computer system 500 in which embodiments of the present disclosure, or portions thereof, can be implemented as computer-readable code. For example, the methods illustrated by flowchart 200 of FIG. 2 can be implemented in system 500. Various embodiments of the present disclosure are described in terms of this example computer system 500. After reading this description, it will become apparent to a person skilled in the relevant art how to implement embodiments of the present disclosure using other computer systems and/or computer architectures.

It should be noted that the simulation, synthesis and/or manufacture of various embodiments of this disclosure may be accomplished, in part, through the use of computer-readable code, including general programming languages (such as C or C++), hardware description languages (HDL) such as, for example, Verilog HDL, VHDL, Altera HDL (AHDL), or other available programming and/or schematic capture tools (such as circuit capture tools). This computer readable code can be disposed in any computer-readable medium including a semiconductor, magnetic disk, and/or optical disk (such as CD-ROM, DVD-ROM). As such, the code can be transmitted over communication networks including the Internet. The functions accomplished and/or structure provided by the systems and techniques described above can be represented in a memory.

Computer system 500 includes one or more processors, such as processor 504. Processor 504 is connected to a communication infrastructure 506 (e.g., a bus or network).

Computer system 500 also includes a main memory 508, such as random access memory (RAM), and may also include a secondary memory 510. Secondary memory 510 can include, for example, a hard disk drive 512, a removable storage drive 514, and/or a memory stick. Removable storage drive 514 can include a floppy disk drive, a magnetic tape drive, an optical disk drive, a flash memory, or the like. Removable storage drive 514 reads from and/or writes to a removable storage unit 518 in a well-known manner. Removable storage unit 518 can include a floppy disk, magnetic tape, optical disk, flash drive, etc., which is read by and written to by removable storage drive 514. As will be appreciated by persons skilled in the relevant art, removable storage unit 518 includes a computer-readable storage medium having stored therein computer software and/or data. Computer system 500 includes a display interface 502 (which can include input and output devices 503 such as keyboards, mice, etc.) that forwards graphics, text, and other data from communication infrastructure 506 (or from a frame buffer not shown).

In alternative implementations, secondary memory 510 can include other similar devices for allowing computer programs or other instructions to be loaded into computer system 500. Such devices can include, for example, a removable storage unit 522 and an interface 520. Examples of such devices include a program cartridge and cartridge interface (such as those found in video game devices), a removable memory chip (e.g., EPROM or PROM) and associated socket, and other removable storage units 522 and interfaces 520 which allow software and data to be transferred from the removable storage unit 522 to computer system 500.

Computer system 500 can also include a communications interface 524. Communications interface 524 allows software and data to be transferred between computer system 500 and external devices. Communications interface 524 can include a modem, a network interface (such as an Ethernet card), a communications port, a PCMCIA slot and card, or the like. Software and data transferred via communications interface 524 are in the form of signals which may be electronic, electromagnetic, optical, or other signals capable of being received by communications interface 524. These signals are provided to communications interface 524 via a communications path 526. Communications path 526 carries signals and can be implemented using wire or cable, fiber optics, a phone line, a cellular phone link, a RF link or other communications channels.

In this document, the terms "computer program storage medium" and "computer-readable storage medium" are used to generally refer to non-transitory media such as removable storage unit 518, removable storage unit 522, and a hard disk installed in hard disk drive 512. Computer program storage medium and computer-readable storage medium can also refer to memories, such as main memory 508 and secondary memory 510, which can be semiconductor memories (e.g., DRAMs, etc.). Embodiments of the present disclosure can employ any computer-readable medium, known now or in the future. Examples of computer-readable storage mediums include, but are not limited to, non-transitory primary storage devices (e.g., any type of random access memory), and non-transitory secondary storage devices (e.g., hard drives, floppy disks, CD ROMS, ZIP disks, tapes, magnetic storage devices, optical storage devices, MEMS, nanotechnological storage devices, etc.).

These computer program products provide software to computer system 500. Embodiments of the present disclosure are also directed to computer program products including software stored on any computer-readable storage medium. Such software, when executed in one or more data processing devices, causes a data processing device(s) to operate as described herein.

Computer programs (also called computer control logic) are stored in main memory 508 and/or secondary memory 510. Computer programs may also be received via communications interface 524. Such computer programs, when executed, enable computer system 500 to implement embodiments of the present invention as discussed herein. In particular, the computer programs, when executed, enable processor 504 to implement processes of embodiments of the present disclosure, such as the steps in the methods illustrated by flowchart 200 of FIG. 2 can be implemented in system 500. Where embodiments of the present disclosure are implemented using software, the software can be stored in a computer program product and loaded into computer system 500 using removable storage drive 514, interface 520, hard drive 512, or communications interface 524.

According to aspects of the present disclosure, an MIA-aware detailed placement technique includes clustering violation cells with the same Vt to provide a cluster-based MIA-violation-free placement, determining an optimal region for a cluster to minimize the wire-length during clustering and cluster-based detailed placement, and performing a network-flow-based clustering and declustering process to simultaneously cluster and decluster the cells by solving the minimum cost maximum flow problem.

In one embodiment, a method of generating a chip layout provides an opening in a patterned imaging layer. The opening is configured to meet a minimum implant area ("MIA") constraint. The method includes selecting a first cell from among a plurality of cells placed in a row of a cell-based layout. The first cell has a first implant mask feature, which has an area that is less than the MIA constraint. The method also includes selecting a second cell from among the plurality of cells. The method further includes combining the first cell and the second cell to form a cluster. The cluster has a second implant mask feature, which has an area that is larger than the MIA constraint. The method also includes re-placing remaining cells from among the plurality of cells and the cluster to provide an MIA-violation-free cell placement layout.

In a second embodiment, an article of manufacture includes a non-transitory computer readable medium having computer program logic stored thereon that, when executed by a computing device, causes the computing device to perform operations for generating a chip layout to provide an opening in a patterned imaging layer. The opening is configured to meet a minimum implant area ("MIA") constraint. The operations include selecting a first cell from among a plurality of cells placed in a row of a cell-based layout. The first cell has a first implant mask feature, which has an area that is less than the MIA constraint. The operations further include selecting a second cell from among the plurality of cells. The operations also include combining the first cell and the second cell to form a cluster. The cluster has a second implant mask feature, which has an area that is larger than the MIA constraint. The operations also include re-placing remaining cells from among the plurality of cells and the cluster to provide an MIA-violation-free cell placement layout.

In a third embodiment, a system for generating a detailed placement includes a memory that stores instructions for generating a chip layout to provide an opening in a patterned imaging layer and a processor. The opening is configured to meet a minimum implant area ("MIA") constraint. The processor is configured to select a first cell from among a plurality of cells placed in a row of a cell-based layout. The first cell has a first implant mask feature, which has an area that is less than the MIA constraint. The processor is further configured to select a second cell from among the plurality of cells. The processor is also configured to combine the first cell and the second cell to form a cluster. The cluster has having a second implant mask feature, which has an area that is larger than the MIA constraint. The processor is configured to re-place remaining cells from among the plurality of cells and the cluster to provide an MIA-violation-free cell placement layout.

The foregoing disclosure outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for generating an opening in a patterned imaging layer in a chip layout, the opening being configured to meet a minimum implant area ("MIA") constraint, the method comprising:
   selecting, using a processor, a first cell from among a plurality of cells placed in a row of a cell-based layout, the first cell having a first implant mask feature, the first implant mask feature having an area that is less than the MIA constraint;
   selecting, using the processor, a second cell from among the plurality of cells;
   combining, using the processor, the first cell and the second cell to form a cluster, the cluster having a second implant mask feature, the second implant mask feature having an area that is larger than the MIA constraint;
   re-placing, using the processor, remaining cells from among the plurality of cells and the cluster to provide an MIA-violation-free cell placement layout;
   rearranging, using the processor, an orientation of at least one cell from among the plurality of cells or the cluster to compress the MIA-violation-free cell placement layout to provide the chip layout; and
   transforming, using the processor, the chip layout to a format suitable for fabrication.

2. The method of claim 1, wherein the selecting the second cell comprises iteratively combining the first cell with an other cell from among the plurality of cells until a combination of the first cell and the other cell form the second implant mask feature.

3. The method of claim 2, wherein the iteratively combining the first cell with the other cell further comprises iteratively combining the first cell with the other cell to minimize a wire-length between the first cell and the second cell.

4. The method of claim 1, further comprising combining the cluster with one or more nearby cells to solve any remaining MIA violations.

5. The method of claim 1, wherein the rearranging further comprises:
   flipping the first cell to adjust a minimum spacing between the flipped cell and an adjacent cell from among the plurality of cells; and
   adjusting a whitespace between the flipped cell and the adjacent cell to provide an MIA compliant implant area.

6. The method of claim 5, wherein the flipping is performed in a single row with a fixed cell order.

7. The method of claim 1, wherein the format suitable for fabrication is suitable for use by a semiconductor foundry to manufacture a plurality of masks corresponding to the chip layout utilizing a plurality of photolithography operations.

8. The method of claim 7, wherein the format suitable for fabrication includes at least one of a netlist of the chip layout, coordinates of the plurality of cells, coordinates of macros of the chip layout, orientations of the plurality of cells, orientations of the plurality of macros, implant layers of the plurality of cells, and a standard cell library.

9. The method of claim 8, wherein the format suitable for fabrication includes one or more of a library exchange (LEF) format or a design exchange format (DEF).

10. An article of manufacture comprising a non-transitory computer readable medium having computer program logic stored thereon that, when executed by a computing device, causes the computing device to perform operations for generating an opening in a patterned imaging layer in a chip layout, the opening being configured to meet a minimum implant area ("MIA") constraint, the operations comprising:
    selecting a first cell from among a plurality of cells placed in a row of a cell-based layout, the first cell having a first implant mask feature, the first implant mask feature having an area that is less than the MIA constraint;
    selecting a second cell from among the plurality of cells;
    combining the first cell and the second cell to form a cluster, the cluster having a second implant mask feature, the second implant mask feature having an area that is larger than the MIA constraint;
    re-placing remaining cells from among the plurality of cells and the cluster to provide an MIA-violation-free cell placement layout;
    rearranging an orientation of at least one cell from among the plurality of cells or the cluster to compress the MIA-violation-free cell placement layout to provide the chip layout; and
    transforming the chip layout into a format suitable for fabrication.

11. The article of manufacture of claim 10, wherein the selecting the second cell comprises iteratively combining the first cell with an other another cell from among the plurality of cells until a combination of the first cell and the other cell form the second implant mask feature.

12. The article of manufacture of claim 11, wherein the iteratively combining the first cell with the other cell further comprises iteratively combining the first cell with the other cell to minimize a wire-length between the first cell and the second cell.

13. The article of manufacture of claim 10, wherein the operations further comprise: combining the cluster with one or more nearby cells to solve any remaining MIA violations.

14. The article of manufacture of claim 10, wherein the rearranging further comprises:
  flipping the first cell to adjust a minimum spacing between the flipped cell and an adjacent cell from among the plurality of cells; and
  adjusting a whitespace between the flipped cell and the adjacent cell to provide an MIA compliant implant area.

15. The article of manufacture of claim 14, wherein the flipping is performed in a single row with a fixed cell order.

16. A system for generating an opening in a patterned imaging layer in a chip layout, the opening being configured to meet a minimum implant area ("MIA") constraint, the system comprising:
  a memory that stores instructions for generating the chip layout;
  a processor configured to execute the instructions, the instructions, when executed by the processor, configuring the processor to:
    select a first cell from among a plurality of cells placed in a row of a cell-based layout, the first cell having a first implant mask feature, the first implant mask feature having an area that is less than the MIA constraint;
    select a second cell from among the plurality of cells;
    combine the first cell and the second cell to form a cluster, the cluster having a second implant mask feature, the second implant mask feature having an area that is larger than the MIA constraint;
    re-place remaining cells from among the plurality of cells and the cluster to provide an MIA-violation-free cell placement layout;
    rearrange an orientation of at least one cell from among the plurality of cells or the cluster to compress the MIA-violation-free cell placement layout to provide the chip layout; and
    transform the chip layout into a format suitable for fabrication.

17. The system of claim 16, wherein, to select the second cell, the instructions further configure the processor to iteratively combine the first cell with an other cell from among the plurality of cells until a combination of the first cell and the other cell form the second implant mask feature.

18. The system of claim 17, wherein the instructions further configure the processor to iteratively combine the first cell with the other cell to minimize a wire-length between the first cell and the second cell.

19. The system of claim 16, wherein the instructions further configure the processor to combine the cluster with one or more nearby cells to solve any remaining MIA violations.

20. The system of claim 16, wherein, to rearrange an orientation of the least one cell from among the plurality of cells or the cluster, the instructions further configure the processor to:
  flip a first cell from among the plurality of cells to adjust a minimum spacing between the flipped cell and an adjacent cell from among the plurality of cells; and
  adjust a whitespace in between the flipped cell and the adjacent cell to provide an MIA compliant implant area.

* * * * *